United States Patent [19]

Jassal

[11] 4,285,920
[45] Aug. 25, 1981

[54] SOLVENT EXTRACTION PROCESS FOR PREPARING PURIFIED PHOSPHORIC ACID AND SODIUM PHOSPHATE SALTS

[75] Inventor: Avtar S. Jassal, Katonah, N.Y.

[73] Assignee: Stauffer Chemical Company, Westport, Conn.

[21] Appl. No.: 92,598

[22] Filed: Nov. 8, 1979

[51] Int. Cl.$^3$ .............................................. C01B 25/01
[52] U.S. Cl. .................................. 423/305; 423/321 S
[58] Field of Search ............... 423/321 R, 321 S, 167, 423/305; 210/21, 22, 51, 53, 61, 73 R; 71/34, 41, 42, 43

[56] References Cited

U.S. PATENT DOCUMENTS

| | | | |
|---|---|---|---|
| 2,044,940 | 6/1936 | Haag et al. | 423/321 X |
| 3,081,151 | 3/1963 | Marty | 423/321 X |
| 3,917,805 | 11/1975 | Takahara | 423/321 S |
| 3,993,733 | 11/1976 | Irani | 423/313 |
| 3,993,736 | 11/1976 | Irani | 423/321 S |
| 4,024,225 | 5/1977 | Chiang | 423/305 |
| 4,112,118 | 9/1978 | Cussons et al. | 423/313 |
| 4,134,962 | 1/1979 | Ehlers | 423/313 |

Primary Examiner—Charles N. Hart
Assistant Examiner—David R. Sadowski
Attorney, Agent, or Firm—Roger S. Benjamin

[57] ABSTRACT

Disclosed is a process for concurrently preparing purified phosphoric acid and purified sodium phosphate salts by employing a solvent extraction process with three neutralization steps.

9 Claims, 1 Drawing Figure

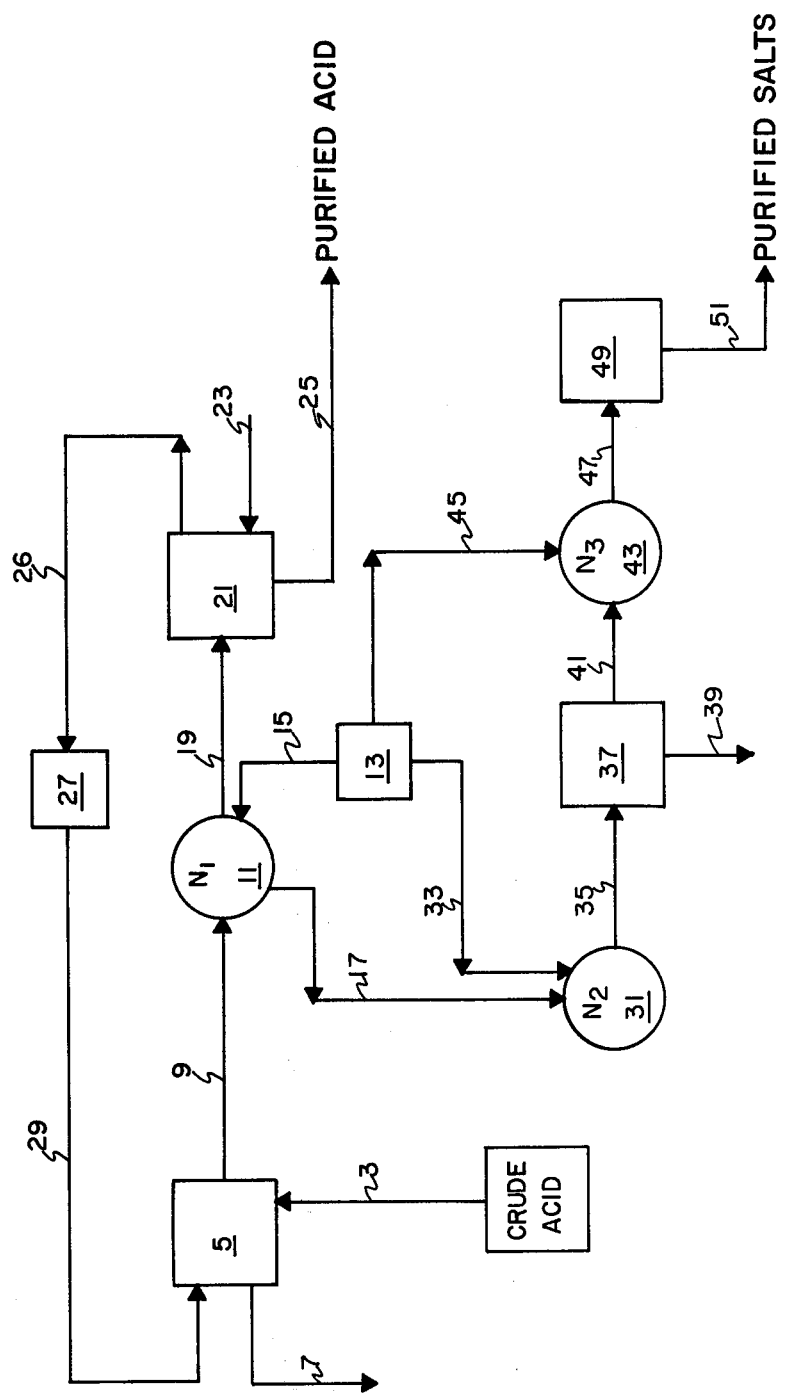

SOLVENT EXTRACTION PROCESS FOR PREPARING PURIFIED PHOSPHORIC ACID AND SODIUM PHOSPHATE SALTS

BACKGROUND OF THE INVENTION

Phosphoric acid prepared by the digestion of phosphate rock commonly contains cationic impurities such as calcium, magnesium, aluminum and iron.

It is known to purify phosphoric acid by solvent extraction techniques. The organic solvent displays a greater preference for phosphoric acid than it does for the metal salt impurities in the crude phosphoric acid. Nevertheless, an undesirable residue of polyvalent cationic impurities amounting to 25 to 250 parts per million usually remains in the solvent phase.

U.S. Pat. No. 3,993,733 describes a process for preparing alkaline metal phosphates by neutralizing a solvent acid phase to obtain a precipitate and thereafter neutralizing the resultant aqueous acid phase to form a solution of soluble phosphate salts.

U.S. Pat. No. 3,993,736 describes a process for preparing purified phosphoric acid by first neutralizing an acid containing solvent phase to obtain a precipitate, neutralizing the resultant aqueous phase to form a solution of soluble phosphate salts, and thereafter reconverting the phosphate salts to phosphoric acid.

U.S. Pat. No. 4,112,118 extracts phosphoric acid containing solvent with an alkaline solution to remove substantially all of the $P_2O_5$ value of the solvent. The aqueous extract contains phosphoric acid and phosphate salts in combination.

U.S. Pat. No. 4,024,225 describes a sequential neutralization procedure for preparing phosphate salts.

U.S. Pat. No. 3,081,151 prepares a purified phosphate salt liquor using a two-step neutralization.

Prior art processes are not adapted to the concurrent production of purified phosphoric acid and purified phosphate salt.

THE INVENTION

This invention is an improved solvent extraction process wherein the organic solvent extract phase from a crude phosphoric acid extraction is treated to recover both purified phosphoric acid and purified sodium phosphate salts. The process of this invention converts at least one-half of the $P_2O_5$ value in the solvent extract to purified phosphoric acid. A minor fraction of the $P_2O_5$ is separated from the purified acid to become purified sodium phosphate salts.

The objectives of this invention are accomplished by subjecting solvent extract containing $P_2O_5$ values to three neutralization steps. A first partial neutralization step withdraws a substantial part of unwanted polyvalent cations from the organic solvent extract phase without neutralizing or removing a major portion of phosphoric acid contained in the solvent phase. The resultant solvent phase is washed with water to give a purified phosphoric acid. The aqueous raffinate produced by the first step partial neutralization is sent to a second neutralization step. The second neutralization step further neutralizes the aqueous raffinate from the first partial neutralization step and results in the precipitation of unwanted cationic impurities. Thereafter, a third neutralization step takes the precipitate-free raffinate from the second neutralization and completes the neutralization to obtain a purified salt solution.

DESCRIPTION OF THE INVENTION

The general technique of crude phosphoric acid purification by solvent extraction is well-known and is typified by U.S. Pat. No. 3,917,805; the disclosure of which is incorporated herein by reference.

The organic solvent used for extraction must be capable of dissolving phosphoric acid and have a limited miscibility with water. Suitable solvents include alcohols, ketones, amines, aldehydes, and organophosphates. Examples of solvents having utility in this invention are diethyl ether, diisopropyl ether, di-n-butyl ether, ethyl acetate, butyl acetate, amyl acetate, ethyl butyrate, n-butyl alcohol, isobutyl alcohol, amyl alcohol, isoamyl alcohol, hexanol, and octanol. Mixtures of solvents may be used if desired. Preferred solvents are the $C_4$–$C_8$ primary, secondary and tertiary alcohols. Mixed five carbon alcohols are a particularly preferred solvent for the process of this invention.

Crude phosphoric acid is extracted with organic solvent to yield; (1) a phosphoric acid enriched organic solvent phase, and (2) an aqueous raffinate phase depleted in $P_2O_5$ values and containing the major part of the cationic impurities originally present in the crude acid.

The process of this invention is directed to treatment of the solvent phase resulting from solvent extraction of crude phosphoric acid.

FIRST STEP

Partial Neutralization

Organic solvent (containing $P_2O_5$ values) produced by the solvent extraction of crude phosphoric acid is treated by intimate contact with a selected volume ratio of aqueous neutralizing agent containing a predetermined amount of alkaline sodium salts. The treatment of the phosphoric acid containing solvent with aqueous neutralizng agent results in the formation of two phases. The first phase (labeled N-1S) is purified organic solvent containing phosphoric acid substantially free of polyvalent cationic impurities. Typically, solvent phase N-1S has a polyvalent cation content of from about 0.1 to about 10 ppm. The second phase (labeled N-1R) from the first step neutralization is an acidic partially neutralized raffinate containing phosphate salts, phosphoric acid, and most of the polyvalent cationic impurities originally present in the solvent phase before treatment with the aqueous neutralizing agent.

The aqueous neutralizing agent is a water solution of alkaline sodium salts selected from sodium carbonate, sodium bicarbonate, sodium sesquicarbonate, sodium hydroxide, or mixtures thereof.

The aqueous neutralizing agent is intimately contacted with the organic solvent in a volume ratio of 1 part aqueous neutralizing agent to from about 50 to about 300 parts of organic solvent. Preferably, the volume ratio of aqueous neutralizing agent to organic solvent is from 1:75 to 1:150. Too small an amount of neutralizing agent will be ineffective in removing the major portion of cationic impurities in the solvent phase. Conversely, too large a proportion of neutralizing agent will extract the major portion of water soluble phosphoric acid from the solvent phase and subsequently prevent recovery of purified phosphoric acid directly from the organic solvent.

The quantity of neutralizing agent in the aqueous neutralizing agent should be an amount effective to neutralize no more than 40 weight percent of the phosphoric acid value in the organic solvent. The alkaline sodium salt content of the neutralizing agent should preferably be such as to neutralize from about 15 weight percent to 35 weight percent of the phosphoric acid in the organic solvent. Alkaline sodium salt levels which neutralize over 40 weight percent of the phosphoric acid value in the solvent extract convert an undesirably large proportion of phosphoric acid to phosphate salts. In addition, the amount of alkaline sodium salt used in the first step must not destroy the highly acidic character of the raffinate phase. A raffinate phase with a pH above 3 tends to release precipitate and promote equipment fouling.

At the conclusion of the first step partial neutralization both phases N-1S and N-1R should be highly acidic (pH less than 2.5). The function of the first step partial neutralization is to transfer substantially all of the polyvalent cations from the organic solvent into the aqueous raffinate.

The first step neutralization is advantageously carried out in an apparatus which permits effective contact of two immiscible phases. Conventional apparatus such as mixer-settler extraction batteries, columns, etc., are suitable for performing the first step partial neutralization.

The phase N-1S is a purified solvent which may be conventionally processed by reextraction with water and/or phosphoric acid to release a purified acid product. Generally, 60 to 85 weight percent of the original phosphoric acid ($P_2O_5$ value) in the untreated organic solvent starting material is recovered from the N-1S phase as purified phosphoric acid. The purified acid may be concentrated or further purified if desired. The solvent separated from the purified acid may be dehydrated, distilled and reused in the initial extraction of crude phosphoric acid.

The aqueous raffinate phase N-1R is forwarded for processing to the second neutralization step:

SECOND STEP NEUTRALIZATION

The second step neutralization treats only the aqueous raffinate phase (N-1R) from the first step partial neutralization.

The second step neutralization gives a controlled precipitation of most of the polyvalent cation content in aqueous phase N-1R. An advantage of confining the precipitation of impurities to a separate second neutralization stage is that fine control of the precipitation process is possible, high concentration levels of unwanted cations may be maintained, and fouling of process equipment is eliminated.

Second step neutralization requires the addition of alkaline sodium salts to aqueous phase N-1R in an amount effective to give a final pH in the range of 4 to 6. The final aqueous raffinate resulting from the second neutralization step is designated N-2R.

Removal of cations from aqueous phase N-1R is promoted by maintaining its cation concentration as high as possible. Consequently, it is advantageous to add alkaline sodium salts in a form absent significant amounts of extraneous water. This object of limited water addition may be met by using concentrated forms of alkaline sodium salts such as solid sodium carbonate or solid sodium hydroxide. Alternatively, highly concentrated slurries or solutions of alkaline sodium salts selected from sodium carbonate, sodium bicarbonate, sodium sesquicarbonate, sodium hydroxide, or mixtures thereof may be used.

The optimum neutralization within the range of 4 to 6 may be determined by taking an aliquot portion of the aqueous raffinate and reacting it with alkaline sodium salt until precipitate no longer forms. It is generally desirable to avoid large excesses of neutralizing agents since high pH tends to solubilize precipitate and redissolve the cationic impurities.

The precipitate formed by the second step neutralization is separated from aqueous raffinate N-2R. In some cases it is desirable to let the precipitate age for a time period in the range of ten minutes to six hours to promote its removal. Separation of the precipitate may be performed by conventional means such as centrifugation, filtration, or decantation. The precipitate is withdrawn from the process as waste.

Aqueous raffinate N-2R is forwarded for processing to the third neutralization step.

THIRD NEUTRALIZATION STEP

The precipitate-free raffinate (N-2R) from the second neutralization step is further neutralized in the third neutralization step to yield a purified solution of sodium phosphate salts. The purified phosphate salt solution product of the third step is designated aqueous raffinate N-3R.

The third step neutralization is conducted by mixing alkaline sodium salts with raffinate N-2R to give a pH of 8 or more. The alkaline sodium salts used for the third step neutralization are selected from sodium hydroxide or sodium hydroxide in combination with one or more of sodium carbonate, sodium bicarbonate, or sodium sesquicarbonate. The presence of sodium hydroxide is generally necessary to achieve the high pH levels required for the third neutralization step. The alkaline sodium salts (containing sodium hydroxide) may be used in the form of solutions, slurries or solids. If subsequent recovery of solid phosphate salts from raffinate N-3R is desired, it is advantageous to use alkaline salts having the minimum practical water content.

The exact amount of alkaline sodium salts used to neutralize raffinate N-2R will depend on the sodium phosphate salt mixture of salts desired as product. Generally, alkaline sodium salt is added to raffinate N-2R to the point where the sodium to phosphorous mole ratio of the desired phosphate salt product is achieved. Typically, useful sodium to phosphorus mole ratio are in the range from 1.6:1 to 1.9:1. For example, neutralization to a sodium to phosphorous mole ratio of 1.67 to 1 will form a solution equivalent to an equimolar mixture of disodium hydrogen phosphate and monosodium dihydrogen phosphate. Sodium tripolyphosphate may be formed by tempering and calcining this equimolar mixture of salts.

The process of this invention may be used to prepare disodium phosphate, trisodium phosphate, sodium acid pyrophosphate, tetrasodium pyrophosphate, the $Na_2O$—$P_2O_5$ glasses (e.g. hexametaphosphate), sodium tripolyphosphate or mixtures thereof.

This invention finds particular application for the preparation of laundering detergent chemicals such as sodium tripolyphosphate. Alternatively, sodium tripolyphosphate may be further processed to yield chlorinated trisodium phosphate.

Phosphate salts solution N-3R resulting from the third step neutralization is advantageously processed to recover solid sodium phosphate salt products by techniques such as crystallization, drying, etc.

The process of this invention is illustrated by reference to the flow diagram depicted in the FIGURE.

Crude phosphoric acid prepared by the acid digestion of phosphate rock is sent via line (3) to primary solvent extraction battery (5) where it is intimately contacted with organic solvent entering the battery via line (29). The products of the primary extraction battery are a $P_2O_5$ depleted aqueous raffinate stream which is withdrawn via line (7) for separate treatment and a phosphoric acid enriched solvent phase which exists via line (9). The solvent from line (9) moves to a first neutralization zone $N_1$ (11) where it is contacted with aqueous alkaline neutralizing agent supplied from container (13) via line (15). Sufficient neutralizing agent is taken from container (13) to neutralize approximately 25 weight percent of the phosphoric acid in the first neutralization zone (11). The first neutralization zone releases a solvent phase and an aqueous phase. The aqueous phase from the first neutralization zone is sent for further treatment as a partially neutralized raffinate via line (17). The solvent extract phase from the first neutralization zone (11) is sent via line (19) to acid release chamber (21). Water and/or dilute phosphoric acid entering chamber (21) via line (23) reextracts purified aqueous phosphoric acid product which exits via line (25) and recycles $P_2O_5$ depleted solvent via line (26) to dehydration and distillation purification unit (27) where it is purified and recycled to the primary extraction battery (5) via line (29).

The partially neutralized aqueous raffinate from $N_1$ is sent via line (17) to second neutralization zone $N_2$ (31). Alkaline neutralizing agent from vessel (13) is supplied via line (33) so zone (31) in an amount which yields a solution having a pH in the range of 4 to 6. The precipitate containing aqueous solution from the second neutralization zone (31) is sent to filtration unit (37) via line (35) wherein solid precipitate is filtered out and removed through line (39). Aqueous precipitate-free filtrate is sent via line (41) to the third neutralization zone $N_3$ (43). Neutralizing agent from vessel (13) is sent via line (45) to zone (43) to give a pH above 8 and from an aqueous phosphate salt solution. The aqueous phosphate salt solution is sent via line (47) to crystallizer and dryer unit (49) which produces a solid phosphate salt product which exist via line (51).

EXAMPLE

This example illustrates the practice of the invention.

Materials and test conditions

Crude phosphoric acid (produced by sulfuric acid digestion of phosphate rock). Analysis: 46% $P_2O_5$; 820 ppm iron. The experiment was performed at ambient temperature and pressure. All proportions are by weight unless otherwise indicated.

Method

A twelve stage counter-current liquid/liquid extraction was carried out on a laboratory scale using a battery of twelve 5,000 milliliter separatory funnels.* 476 grams of crude phosphoric acid was extracted with a total of 1,568 grams of mixed $C_5$ aliphatic alcohols.

*Method described in Liquid-Liquid Extraction by L. Alders, Elsevier Publishing Company, New York 1955 pages 115-122, the disclosure of which is incorporated herein by reference.

The extraction produced 87 grams of aqueous raffinate phase (Analysis: 12.5% $P_2O_5$; 44,860 ppm. iron) and 1,957 grams of an alcohol solvent phase containing 10.7 weight percent $P_2O_5$ and 151 ppm. iron.

A first step partial neutralization was conducted by shaking the organic solvent phase with 14.8 grams of 50% sodium hydroxide solution using 5,000 ml. separatory funnels in a six stage counter current extraction procedure.* This first step neutralization yielded (1) aqueous raffinate (labeled N-1R) of 147 grams containing 21.4% $P_2O_5$ and 1,998 ppm. iron and (2) a purified solvent phase (labeled N-1S) of 1,824 grams containing 9.8% $P_2O_5$ and 1 ppm. iron.

The purified solvent phase N-1S was washed with deionized water to release purified phosphoric acid product.

The aqueous raffinite phase N-1R was further treated by a second neutralization step by admixture with 30 grams of solid sodium carbonate. The second neutralization resulted in the formation of 8.7 grams of a solid precipitate containing 7% $P_2O_5$, 10,000 ppm. iron, and 168 grams of an aqueous raffinate (labeled N-2R) containing 18.4% $P_2O_5$ and 1,120 ppm. iron. Aqueous raffinate N-2R was filtered on 10.2 cm. filter paper in a Buchner funnel to remove the precipitate.

A third neutralization was performed by mixing aqueous raffinate N-2R with 4.65 grams of solid sodium carbonate to achieve a sodium to phosphorus ratio of 1.7. Thereafter, the neutralization was completed by adding 4.67 grams of 50% sodium hydroxide to give a phosphate salt solution having a sodium to phosphorus ratio of 1.8 and a pH of 8.8.

The product of the third step neutralization was 175 grams of a 39% disodium phosphate solution. The phosphate solution was dried and yielded 68.4 grams of solid disodium phosphate.

This example shows the concurrent preparation of purified phosphoric acid and sodium phosphate salts. Approximately 15% of the $P_2O_5$ content orginally in the organic solvent phase was converted to sodium phosphate salts. The balance of the $P_2O_5$ in the original organic solvent was withdrawn as purified phosphoric acid. Iron, a typical cationic impurity, was effectively removed from the phosphoric acid product. In addition, a major part of the iron was removed from the phosphate salt product.

Having now a fully described the process of this invention, it will be apparent that many modifications can be made thereto without departing from the scope of the invention as set forth herein.

What is claimed:

1. A process for concurrently preparing purified phosphoric acid and phosphate salts which comprises the steps of:

(A) extracting crude phosphoric acid with a nonaqueous solvent to give a phosphoric acid enriched organic solvent phase; (B) contacting the phosphoric acid enriched organic solvent phase of step (A) with aqueous neutralizing agent containing alkaline sodium salts selected from the group consisting of sodium carbonate, sodium bicarbonate, sodium sesquicarbonate, sodium hydroxide, or mixtures thereof; wherein the volume ratio of said aqueous neutralizing agent to said organic solvent is from about 1:50 to about 1:300 and the alkaline sodium salt content of said neutralizing agent is an amount effective to convert from about 15% to about 35% of the phosphoric acid in the solvent phase from step (A) to sodium phosphate salts; said contact resulting in (I) a purified organic solvent phase containing a major portion of the phosphoric acid originally present in the solvent phase from step (A), and (II) a partially neutralized aqueous raffinate phase;

(C) reextracting the purified solvent phase of step (B) with water or dilute phosphoric acid to release a purified phosphoric acid product;

(D) neutralizing aqueous raffinate phase of step (B) to a pH in the range of 4 to 6 with an alkaline sodium salt selected from the group consisting of sodium carbonate, sodium bicarbonate, sodium sesquicarbonate, sodium hydroxide, or mixtures thereof in an amount effective to precipitate a major portion of polyvalent cations dissolved in said raffinate;

(E) separating the precipitate formed in step (D) from the aqueous raffinate to give a precipitate-free aqueous raffinate;

(F) neutralizing the precipitate-free aqueous raffinate of step (E) to a pH of at least 8 with sodium hydroxide or sodium hydroxide in combination with an alkaline sodium salt selected from the group consisting of sodium carbonate, sodium bicarbonate or sodium sesquicarbonate to form a purified solution of phosphate salts.

2. The process of claim 1 wherein the volume of aqueous neutralizing agent to solvent in step (B) is from 1:75 to 1:150.

3. The process of claim 1 wherein the alkaline sodium salt in the aqueous neutralizing agent is sodium carbonate or sodium hydroxide.

4. The process of claim 1 wherein the solvent phase is a $C_4$ to $C_8$ primary, secondary, or tertiary alcohol.

5. The process of claim 1 wherein the solvent phase is a mixture of $C_5$ alcohols.

6. The process of claim 1 wherein the crude phosphoric acid of step (A) is prepared by sulfuric acid digestion of phosphate rock.

7. The process of claim 1 wherein the purified solution of phosphate salts formed in step (F) is processed to give a solid sodium phosphate salt product.

8. The process of claim 1 wherein the reextraction in step (C) is done with water.

9. The process of claim 1 wherein the neutralization of step (F) is carried out to achieve sodium to phosphorus mole ratio in the range of from 1.6:1 to 1.9:1.

* * * * *